(12) United States Patent
Olschewski (10) Patent No.: US 6,947,861 B2
(45) Date of Patent: Sep. 20, 2005

(54) METHOD FOR TIME-OPTIMIZED ACQUISITION OF SPECIAL SPECTRA USING A SCANNING MICROSCOPE

(75) Inventor: Frank Olschewski, Heidelberg (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 0 days.

(21) Appl. No.: 10/249,181

(22) Filed: Mar. 20, 2003

(65) Prior Publication Data

US 2003/0204379 A1 Oct. 30, 2003

(30) Foreign Application Priority Data

Apr. 26, 2002 (DE) .......................................... 102 18 706

(51) Int. Cl.⁷ .............................................. G01N 13/10
(52) U.S. Cl. ........................ 702/76; 702/127; 250/340; 359/368
(58) Field of Search .............................. 702/19, 21–23, 702/27, 28, 76, 30–32, 79, 68, 170, 172, 176, 178, 127, 189; 250/226, 359.07, 340, 390.07, 391, 392, 201.3, 559.06, 459.1, 458.1; 356/326, 300, 302, 303, 904; 700/266; 359/368; 422/50, 62, 67, 119; 703/5, 6, 11, 12

(56) References Cited

U.S. PATENT DOCUMENTS 6,300,639 B1 * 10/2001 Wiederhoeft ............. 250/458.1
6,388,807 B1 *  5/2002 Knebel et al. .............. 359/368
6,483,103 B2   11/2002 Engelhardt et al. ......... 250/226
6,614,031 B2 *  9/2003 Engelhardt et al. ...... 250/459.1

FOREIGN PATENT DOCUMENTS

DE           100 06 800 A1    8/2001    ........... G02B/21/00

* cited by examiner

Primary Examiner—Hal Wachsman
(74) Attorney, Agent, or Firm—Houston Eliseeva LLP (57) ABSTRACT

The method implements time-optimized acquisition of special spectra using a scanning microscope, for which purpose the spectrum is subjected to bisecting interval measurements. The method for time-optimized acquisition of special spectra (emission spectra) using a scanning microscope is implemented in several steps. Firstly a complete spectrum to be examined, within which at least one special spectrum (emission spectrum) is located, is split into at least two intervals. The interval in which the intensity lies above a specific threshold is selected. That interval is split into at least two further intervals, and the procedure is continued until the size of the interval corresponds to the lower limit of the scanning microscope's measurement accuracy. The location of the special spectrum in the complete spectrum is defined, and an interval around it is created and is measured linearly.

5 Claims, 6 Drawing Sheets

METHOD FOR TIME-OPTIMIZED ACQUISITION OF SPECIAL SPECTRA USING A SCANNING MICROSCOPE

CROSS REFERENCE TO RELATED APPLICATIONS

This application claims priority of the German patent application 102 18 706.1 which is incorporated by reference herein.

FIELD OF THE INVENTION

The invention concerns a method for time-optimized acquisition of special spectra using a scanning microscope.

BACKGROUND OF THE INVENTION

In fluorescence microscopy, the specimens to be examined are generally stained with dyes that, as a result of excitation by means of an excitation light beam, emit detected light that has a spectral composition characteristic of the dye. Using a scanning microscope, it is possible to detect in a spectral region from 300 nm to approx. 1000 nm. The special emission spectra of the dyes lie somewhere in the spectral region from 300 nm to 1100 nm. The entire spectral region is thus scanned in order to locate the special spectra. This is time-consuming, and the radiation stress (e.g. bleaching, thermal damage, etc.) on the specimens being examined is high. Those specimens are often no longer usable for further examinations. Since a large expenditure of time and money is required to produce specimens for microscopic examination, the disadvantage of existing systems is that the specimens are exhausted by phototoxic effects simply by looking for the special spectra, without thereby obtaining experimental results or data.

German Patent Application DE 100 06 800.6 discloses an apparatus for selecting and detecting at least one spectral region of a spectrally spread light beam (spectral photometer module). Selection means embodied as sliders are provided in the spread-out light beam in order thereby to deflect portions of the spread-out light beam onto various detectors. The signals of the detectors are then used for image generation. DE 100 06 800.6 does not disclose actuation of the sliders in such a way as to make possible rapid and reliable detection of a special spectrum.

SUMMARY OF THE INVENTION

It is the object of the invention to create a method making possible rapid detection, with little specimen impact, of the location of an emission spectrum of a specimen.

This object is achieved by way of a method comprising the steps:
 a) subdividing a complete spectrum, in which at least one special spectrum is located, into at least two intervals;
 b) determining the intensity of the light in the individual intervals;
 c) selecting one interval in which the intensity lies above a specific threshold (T);
 d) subdividing the selected interval into at least two further intervals;
 e) performing steps b) though c) until the size of the interval corresponds to the lower limit of measurement accuracy;
 f) determining the location of the special spectrum in the complete spectrum on the basis of the information about intensities in the selected intervals;
 g) linearly measuring the special spectrum; and
 h) deriving a model spectrum.

The method for time-optimized acquisition of special spectra (emission spectra) using a scanning microscope is implemented in several steps. Firstly a complete spectrum to be examined, within which at least one special spectrum (emission spectrum) is located, is split into at least two intervals. The interval in which the intensity lies above a specific threshold is selected. That interval is split into at least two further intervals, and the procedure is continued until the size of the interval corresponds to the lower limit of the scanning microscope's measurement accuracy. The location of the special spectrum in the complete spectrum is defined, and an interval around it is created and is measured linearly.

It is conceivable for the intervals each to have the same width and to correspond together to the width of the previous interval.

Splitting of the overall spectrum is performed using sliders of a mirror stop arrangement of an SP (spectral photometer) module, the sliders being moved in motorized fashion and the method being controlled by a computer system.

The invention has the advantage that after a single radiation impact on the specimen with simultaneous acquisition of the essential properties, it is possible to "play with" and learn about the specimen characteristics without causing further damage. Also possible for this purpose is a demo variant which reads the data set from a memory (hard drive, RAM, CD-ROM). This greatly minimizes training time on a confocal scanning microscope, reducing the impact on expensive specimens.

With unknown specimens, for example specimens exhibiting considerable autofluorescence, or with mutants (manipulated by genetic engineering and given a fluorescent label), it is also possible to begin with a lambda scan in order to narrow down by experiment the best conditions for proceeding further. This offers substantial customer benefits. Once optimum settings have been made interactively on the basis of the acquired spectrum, the values can be loaded directly into the SP module so that the best possible images can be made with that data set.

The operating principle of an SP module can be adapted, in terms of mathematical simulation, relatively accurately to the operating principle of the real SP module. The operating principles can be transferred by simulation into the software plane. There, however, they are automatically converted into a type of inverse filter or the like. The true value of the software module becomes apparent when an AOBS (acousto-optical beam splitter) module, which obtains the essential spectral characteristics substantially better than conventional filter systems, is also integrated into the structure of the scanning microscope.

Further advantageous embodiments of the invention are evident from the dependent claims.

BRIEF DESCRIPTION OF THE DRAWINGS

The subject matter of the invention is depicted schematically in the drawings and will be described below with reference to the FIGS, in which.

DETAILED DESCRIPTION OF THE INVENTION

Figure 1:
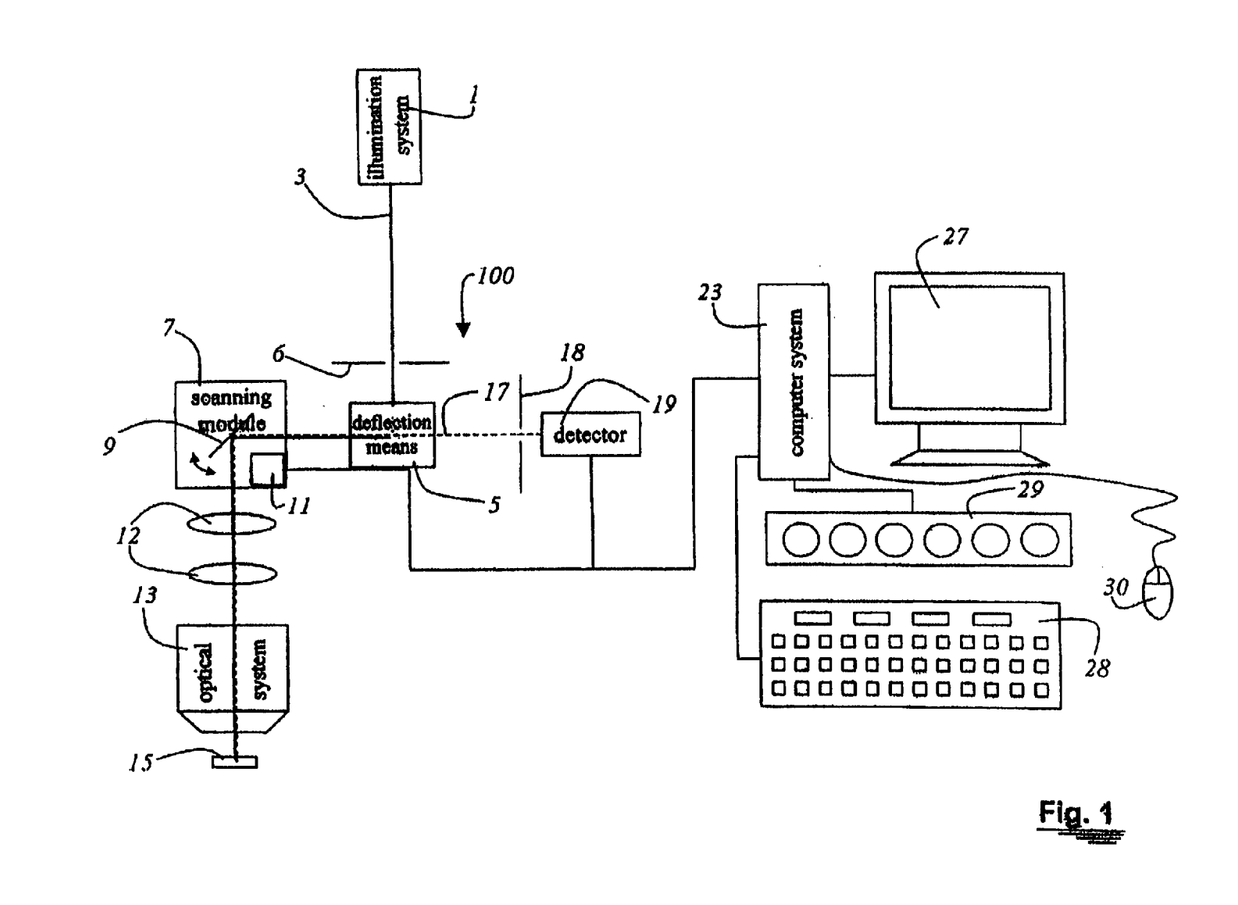
FIG. 1 schematically depicts a scanning microscope.

FIG. 1 schematically shows an exemplary embodiment of a confocal scanning microscope 100. This is not, however, to be construed as a limitation of the invention: it is sufficiently clear to one skilled in the art that the invention can also be implemented with a conventional scanning microscope. Illuminating light beam 3 coming from at least one illumination system 1 is directed by a beam spitter or a suitable deflection means 5 to a scanning module 7. Before illuminating light beam 3 encounters deflection means, it passes through an illumination pinhole 6. Scanning module 7 encompasses a gimbal-mounted scanning mirror 9 that guides illuminating light beam 3 through a scanning optical system 12 and a microscope optical system 13, over or through a specimen 15. In the case of non-transparent specimens 15, illuminating light beam 3 is guided over the specimen surface. With biological specimens 15 (preparations) or transparent specimens, illuminating light beam 3 can also be guided through specimen 15. For that purpose, non-luminescent preparations are optionally prepared with a suitable dye (not depicted, since it is established existing art). The dues present in the specimen are excited by illuminating light beam 3 and each emit light in a separate characteristic region of the spectrum. This light proceeding from specimen 15 defines a detected light beam 17. This travels through microscope optical system 13 and scanning optical system 12 and via scanning module 7 to deflection means 5, passes through the latter, and arrives via a detection pinhole 18 at at least one detector 19, which is embodied as a photomultiplier. It is clear to one skilled in the art that other detection components, e.g. diodes, diode arrays, photomultiplier arrays, CCD chips, or CMOS image sensors, can also be used. Detected light beam 17 proceeding from and defined by specimen 15 is depicted in FIG. 1 as a dashed line. In detector 19, electrical detected signals proportional to the power level of the light proceeding from specimen 15 are generated. Since, as already mentioned above, light of only one wavelength is emitted from specimen 15, it is advisable to insert in front of the at least one detector 19 a selection means 21 for the spectrum proceeding from the specimen. The data generated by detector 19 are forwarded to a computer system 23. At least one peripheral 27 is associated with computer system 23. The peripheral can be, for example, a display on which the user receives instructions for adjusting the scanning microscope or can view the present setup and also the image data in graphical form. Also associated with computer system 23 is an input means that comprises, for example, a keyboard 28, an adjusting apparatus 29 for the components of the microscope system, and a mouse 30.

Figure 2:
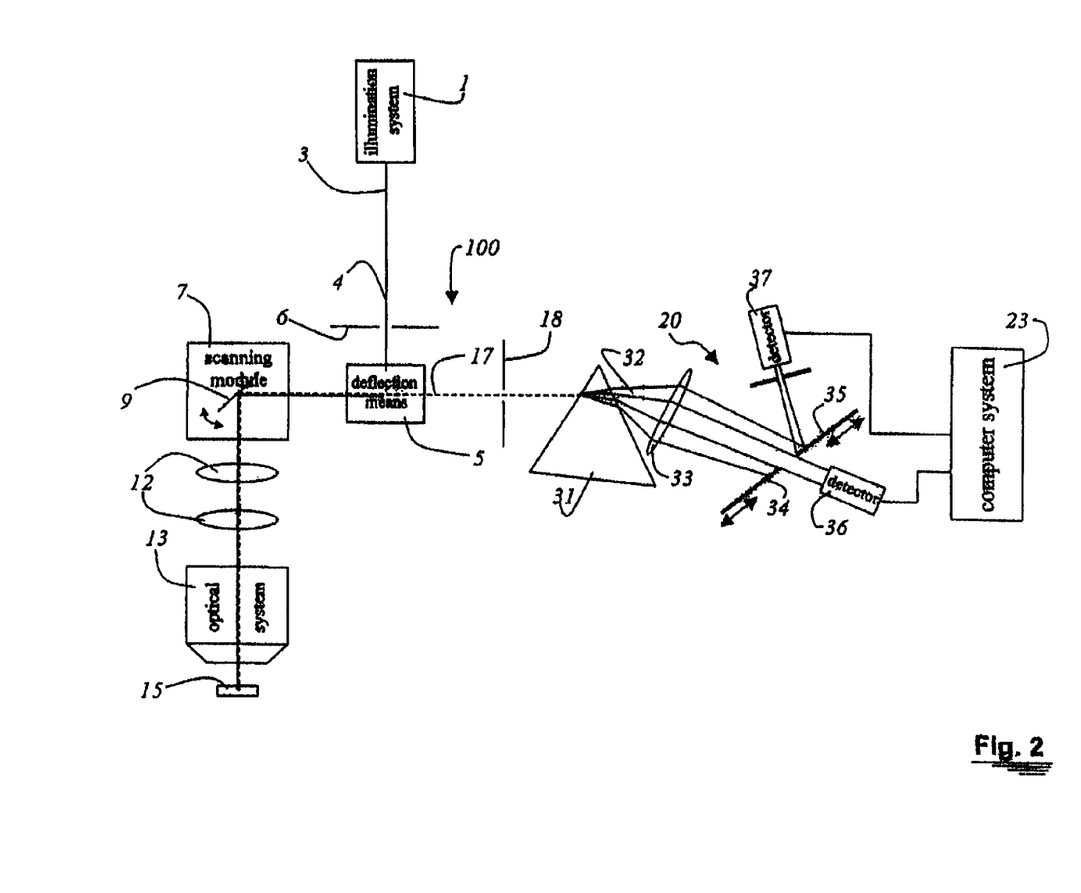
FIG. 2 schematically depicts a scanning microscope, an SP module being placed in front of the detector.

FIG. 2 shows the embodiment of a scanning microscope in which an SP module 20 is arranged in front of the at least one detector 19 as selection means. All other elements shown in FIG. 2 are identical to those of FIG. 1, so that they need not be mentioned again in the description referring to FIG. 2. SP module 20 (FIG. 2) is embodied in such a way that it can acquire a complete lambda scan, i.e. one that records all the wavelengths proceeding from specimen 15. The data are transferred to computer system 23 and can then be displayed, in a manner definable by the user, on display 27. Detected light beam 17 is spatially spectrally divided with a prism 31. Another possibility for spectral division is the use of a reflective or transmissive grating. The spectrally divided light fan 32 is focused with focusing optical system 33, and then strikes a mirror stop arrangement 34, 35. Mirror stop arrangement 34, 35, the means for spectral spatial division, focusing optical system 33, and detectors 36 and 37 are together referred to as SP module 20 (or the multi-band detector).

Figure 3:
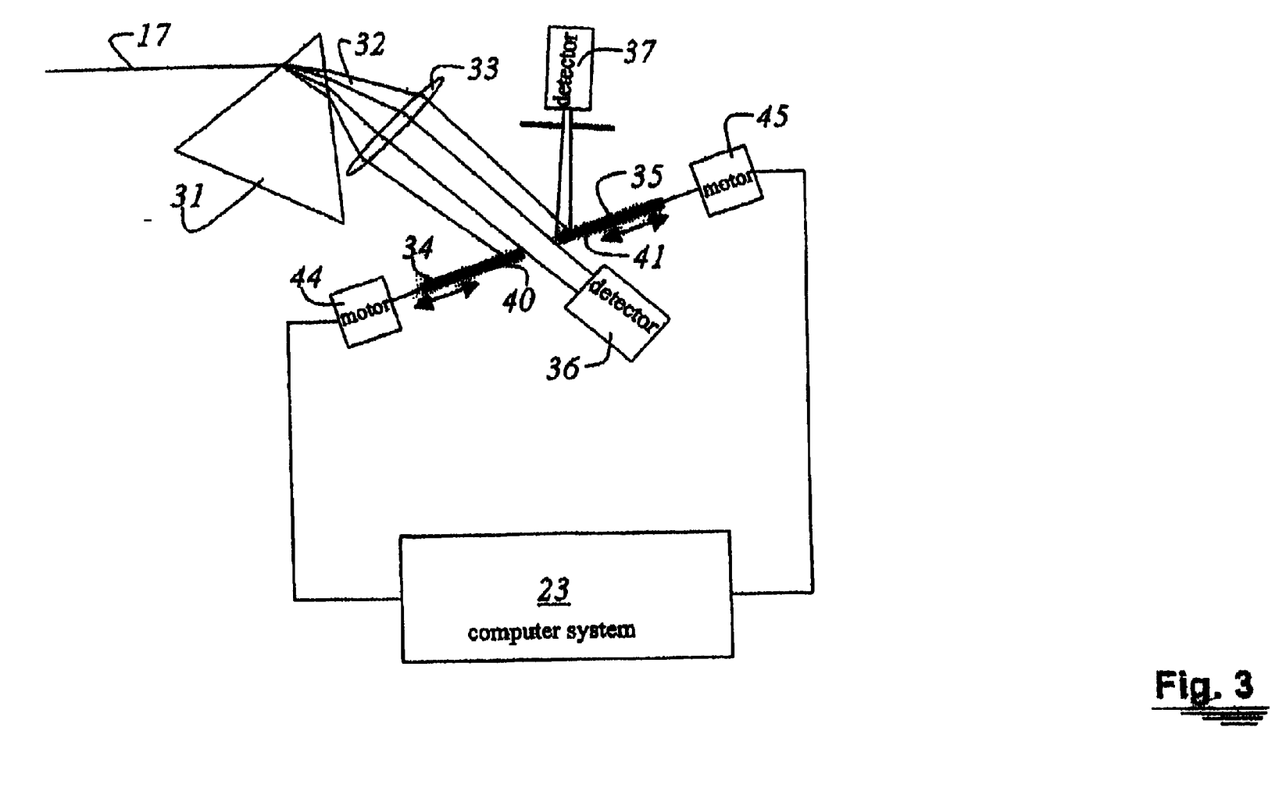
FIG. 3 schematically depicts the SP module in detail.

As is evident from FIG. 3, by means of mirror stop arrangement 34, 35 a desired portion of the spectrum can be systematically selected. In the exemplary embodiment depicted here, mirror stop arrangement 34, 35 is equipped with a first and a second slider 40 and 41. It is self-evident that for the selection of more than two spectral regions, a corresponding number of sliders must be provided. A first motor 44 is associated with first slider 40, and a second motor 45 with second slider 41. Motors 44 and 45 cause a displacement, described in accordance with the method below, of sliders 40 and 41. As a result of the displacement of sliders 40 and 41, only a portion of the divided light fan 32 of detected light beam 17, which contains only light of the selected spectral region, passes through mirror stop arrangement 34, 35 and is detected by detector 36, which is embodied as a photomultiplier. Another portion of the divided light fan 32 is reflected at mirror stop arrangement 35 and arrives at detector 37, which is also embodied as a photomultiplier.

Figure 4A:
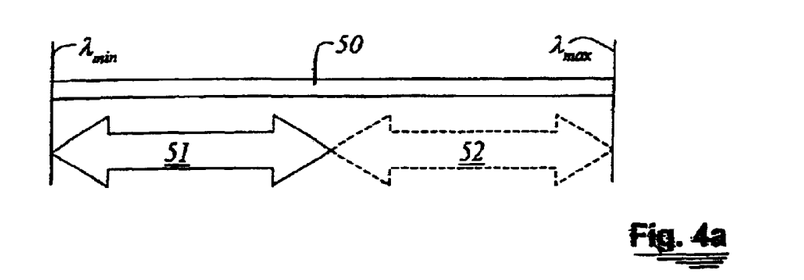
FIG. 4a schematically depicts a first step for acquisition of a spectrum.
Figure 4B:
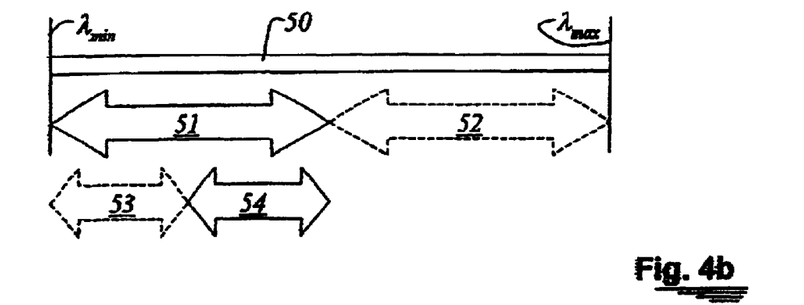
FIG. 4b schematically depicts a second step for acquisition of a spectrum.
Figure 4C:
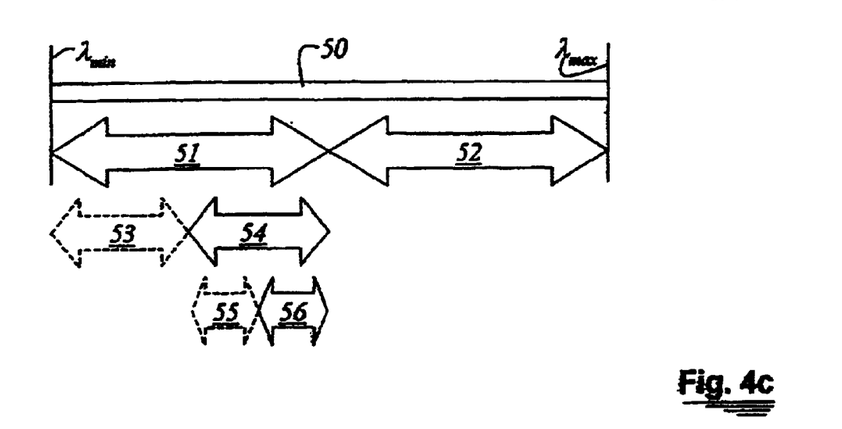
FIG. 4c schematically depicts a third step for acquisition of a spectrum.

The method is depicted schematically in FIGS. 4a through 4c. Instead of subdividing the spectrum into individual small intervals of equal size and scanning them in sequential and linear fashion, what is used here is e.g. a bisection approach. As depicted in FIG. 4a, spectrum 50 ($\lambda_{Min}$ through $\lambda_{Max}$) is subdivided into a first and a second interval 51 and 52. It is especially advantageous if first and second interval 51 and 52 are identical in size. This is not, however, absolutely necessary. If the light measurement in second interval 52 is below a threshold T, then that interval 52 is not searched further. In first interval 51, the measured value is greater than the defined threshold T, and searching therefore continues in first interval 51 (see FIG. 4b). As already described in FIG. 3, sliders 40 and 41 are displaced in such a way that a region of complete spectrum 50 corresponding to the first interval is measured with first detector 36, and a region of the spectrum corresponding to second interval 52 is measured with second detector 37. The image for first interval 51 is summed to yield an average or summed grayscale value, and compared to threshold T. The same procedure is used for second interval 52. In first interval 51, the measured grayscale value is greater than threshold T, so that here a splitting of first interval 51 is performed (see FIG. 4b).

Bisection in first interval 51 then continues. First interval 51 is thus further subdivided by generating a third and fourth interval 53 and 54 in the first interval. This is done in the same way as already described in FIG. 4a. From third and fourth interval 53 and 54, a selection is then made of the one that in turn lies above the defined threshold T. FIG. 4c then depicts the situation in which the same procedure has been applied to fourth interval 54 using the method described above. In the example depicted in FIG. 4c, the smallest step corresponding to the measurement accuracy has been arrived at. Here the fourth interval is subdivided further into a fifth and sixth interval 55 and 56. The measurement accuracy, i.e. the extent to which subdivision of the intervals is to continue, is defined by the user or selected by the computer based on the criterion of whether more information is being gained; this is generally implemented, although with no limitation as to generality, by means of thresholds. As already described in FIG. 4a, mirror sliders 40, 41 are moved correspondingly when setting the desired intervals.

Figure 5:
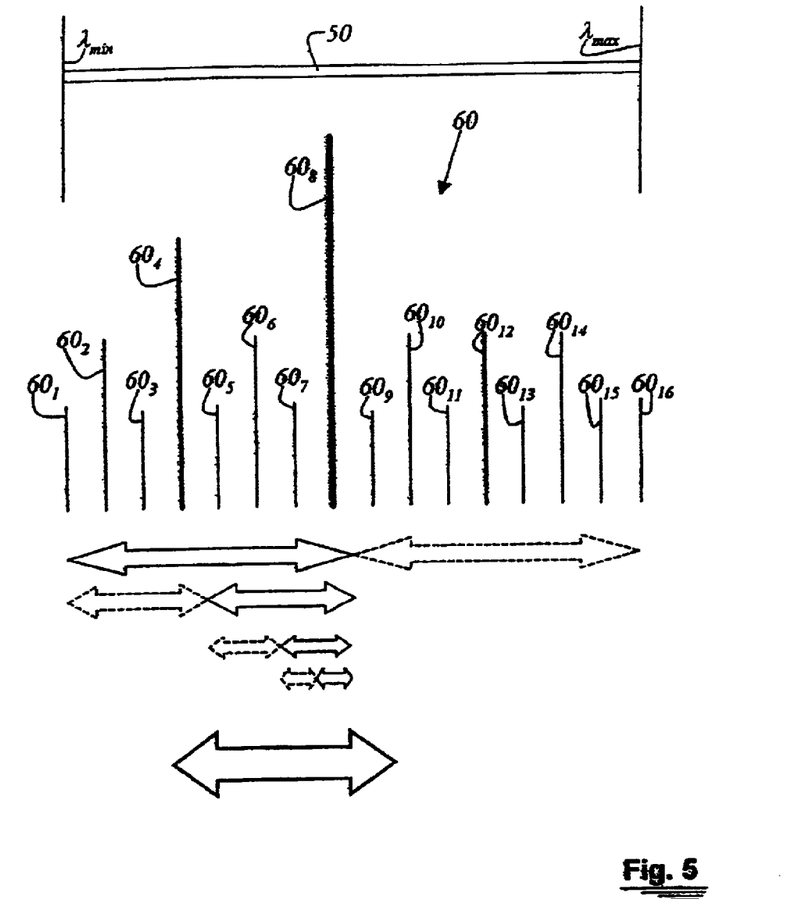
FIG. 5 graphically depicts a complete spectrum, showing an allocation of the vectors necessary for the calculation.

FIG. 5 depicts, by way of example, a fluorescence spectrum 60 having sixteen support lines $60_1$, $60_2$, ... $60_{16}$. Fluorescence spectra have a relatively limited extent on the lambda axis, i.e. they do not extend over the entire region of a spectrum (from $\lambda_{Min}$ to $\lambda_{Max}$). This invention results in a considerable time savings in determine the location of, and subsequently acquiring, a spectrum. For example, if there are 1,000 support points for the region from $\lambda_{Min}$ to $\lambda_{Max}$ and the spectrum to be measured is itself only 200 support points wide, only approx. log(1000)+200=210 measurements are needed here. With the conventional linear measurement method, approximately 1,000 measurements must be performed. In this concrete example, the invention accelerates measurement by a factor of approximately five. The speed-up value depends on the actual spectra being examined; experience indicates that they are spectrally small, and that the model presented above is realistic. In the example depicted in FIG. 5, the system requires four intervals or four measurements 64 in order to find the starting point. After that, a maximum of six scans 66 are required to acquire the spectrum, support points $60_4$, $60_5$ through $60_9$ being individually measured in order to acquire the spectrum. The ten measurements are only slightly fewer than all 16 of the example depicted in FIG. 5 needed to acquire a spectrum, but the logarithm (the logarithm base being defined by the actual number of detectors present) decreases very rapidly as N rises, and the advantage gained with this method becomes that much more appreciable.

Figure 6:
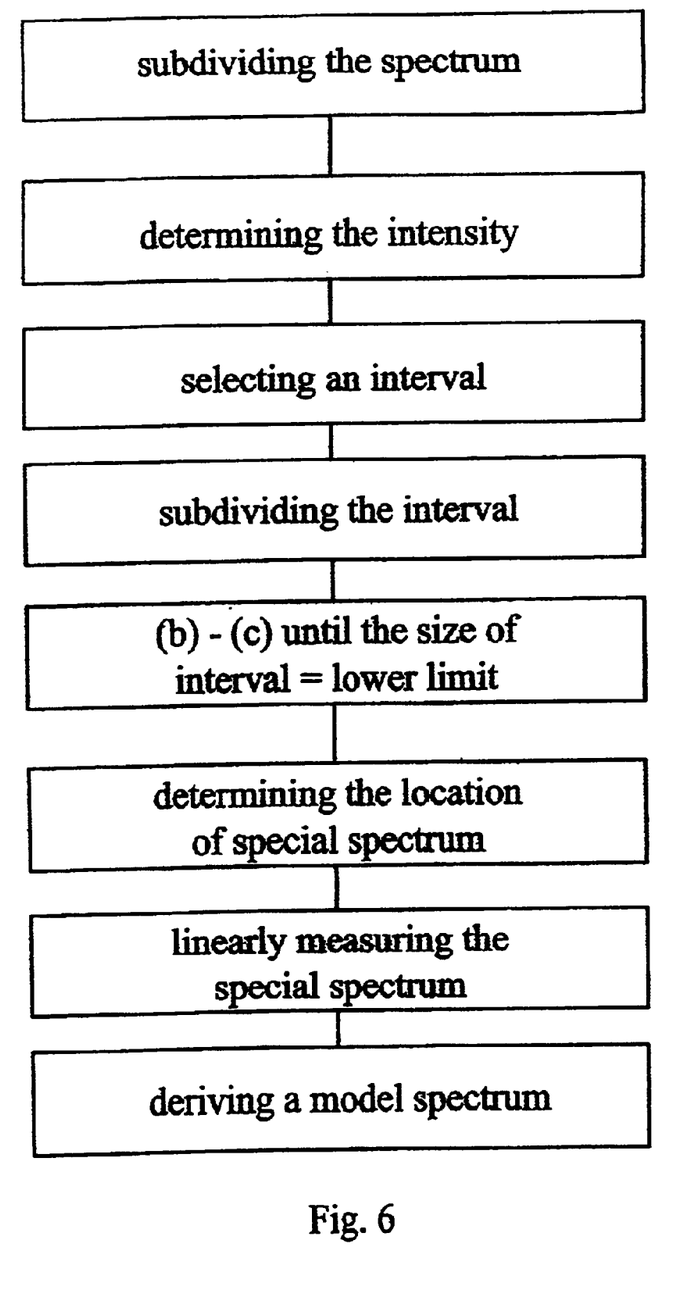
FIG. 6 is a block diagram illustrating a method.

A block diagram illustrating the described method is shown in FIG. 6.

A further alternative would be a full-width search over the complete spectrum between $\lambda_{Min}$ and $\lambda_{Max}$, also examining changes in the cumulative grayscale values along the way. If, for example, the sum of the lower subintervals is coincidentally equal to the sum of the parent intervals, this indicates that everything therein is very homogeneous, and scanning of the rest of the sub-tree of intervals can be discontinued. This yields a further time advantage.

Because several intervals are scanned in the method according to the present invention, and thus a multi-scale match is performed, the spectrum can be described more accurately than if it were scanned through in linear fashion. Information at the finest scale, and the log(N) information from the higher scales, is obtained for each scanned spectral region. This can be utilized to fit the information to a higher-dimensional model (polynomial, splines, etc.) that explains discrepancies between the measurement data at different scales. This can be used to produce a smoothed spectrum (noise reduction) or to obtain super-resolution (spectrum as higher-order model, polynomial, spline). This can be explained as follows. With these assumptions:

$I_1^N$ is the light measurement from the i-th interval of a measurement using N intervals (i.e. we are in the log(N)-th step of bisection);

$\lambda_1^{N+1}$ are the associated interval limits;

$I(\lambda)$ is the real spectrum; and $I(\lambda,\xi)$ is the spectral model, determined from these measurements, that approximates the real spectrum and contains the parameter vector $\xi$ as the model's degree of freedom, the set of determination equations for the measurement is $$I_i^N = \int_{\lambda_i^N}^{\lambda_{i+1}^N} I(\lambda) d\lambda \tag{1}$$

which must also be valid for the selected model $I(\lambda,\xi)$ in the following form:

$$I_i^N = \int_{\lambda_i^N}^{\lambda_{i+1}^N} I(\lambda, \xi) d\lambda \tag{2}$$

In the application from the existing art (without this method), only a one-to-one correlation is made. There are only N measurements $I_1^N$, and only exactly those measurements $I_1^N$ can be selected as the spectral model $I(\lambda,\xi)$ (without packing in more information). Applying this method to the same model with N degrees of freedom yields, in addition to those N measurements, an additional N/2 from the previous bisection step, N/4 from the one before that, etc. This yields $$N_{Total} = N + \frac{N}{2} + \frac{N}{4} + \frac{N}{8} + \frac{N}{16} + \ldots \tag{3}$$

measurements that must be mapped onto N degrees of freedom, resulting in a faster measurement operation as well as much more information about the spectrum. Redundant equations of this kind are solved, according to the existing art, using linear least-squares methods such as the Penrose-Moore pseudoinverse or other methods based on singular value decomposition (the list of numerical methods applicable here is very long, and not limiting for the purposes of this Application), which offer noise reduction as an inherent advantage.

It should also be mentioned that this method is integrated into the image production system of a scanning microscope. In this context, "acquisition" in the description above is to be construed as the acquisition of individual pixels, individual lines, individual images, or individual volumes. The actual manner of implementation is left to the imagination of one skilled in the art, and is not affected by this document.

A further possibility is to assign a different mathematical architecture for the spectral model $I(\lambda,\xi)$. A wide variety of different methods are possible here. Examples include Bezier curves such as those used in CAD for surface modeling, general splines that are widely utilized in signal processing and have been investigated for image processing, kernel regression methods from statistics, radially based networks, or methods that are commonly used in spectroscopy. These have the advantage of deriving an analog component from discrete measurements, and offer a great deal more than currently existing methods.

What is claimed is:

1. A method for acquisition of special spectra using a scanning microscope, comprising the following steps:
    a) subdividing a complete spectrum, in which at least one special spectrum is located, into at least two intervals;
    b) determining the intensity of the light in the at least two intervals;
    c) selecting one interval out of the at least two intervals in which the intensity lies above a specific threshold (T);
    d) subdividing the selected one interval into at least two further intervals;
    e) performing steps b) through c) until the size of the selected one interval corresponds to a lower limit of measurement accuracy;

f) determining the location of the at least one special spectrum in the complete spectrum on the basis of the information about intensities in the at least two selected intervals;

g) defining a location of the at least one special spectrum in the complete spectrum and linearly measuring the at least one special spectrum.

2. The method as defined in claim 1, wherein the at least two further intervals each have the same width and together correspond to the width of the at least two intervals.

3. The method as defined in claim 1, wherein subdivision of the complete spectrum is achieved using sliders of a mirror stop arrangement of spectral photometer module, the sliders being moved in motorized fashion and the method being controlled by a computer system.

4. The method as defined in claim 1, wherein the determination of the intensities in the at least two intervals is performed by means of detectors, one detector being associated with each interval.

5. The method as defined in claim 4, wherein the detectors are embodied as photomultipliers.

* * * * *